Nov. 3, 1925.
C. W. BECK
1,560,133
STEERING WHEEL
Filed April 21, 1924
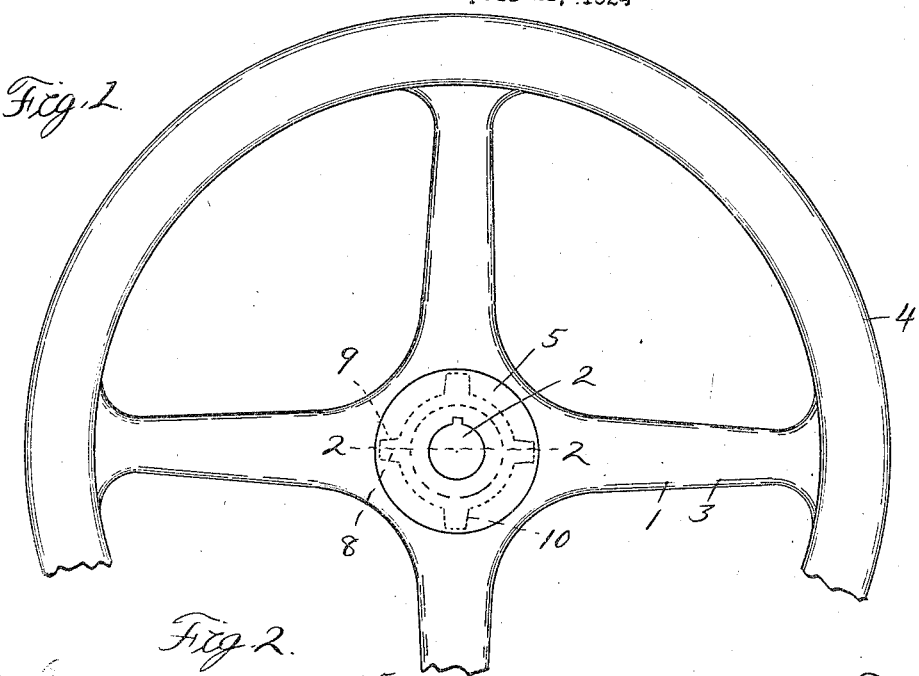
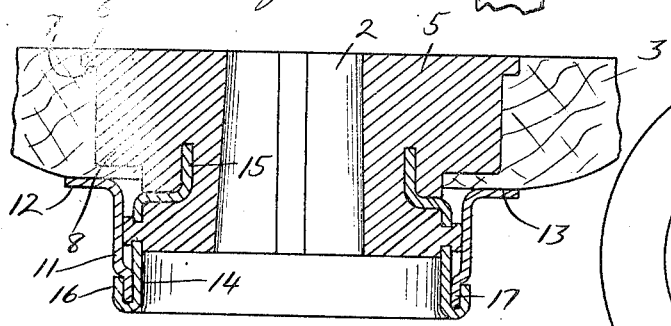
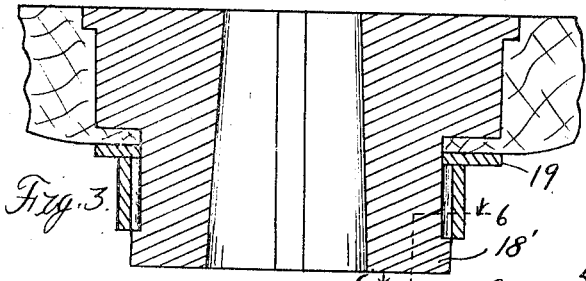
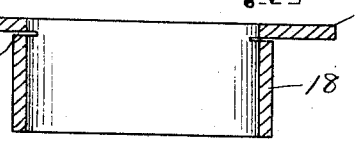
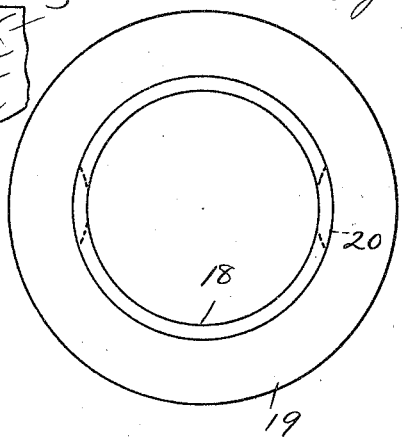
Inventor
Charles W. Beck
By Whittemore Hulbert Whittemore
+Belknap
Attorneys Patented Nov. 3, 1925.

1,560,133

UNITED STATES PATENT OFFICE.

CHARLES W. BECK, OF DETROIT, MICHIGAN, ASSIGNOR TO THE BECK-FROST CORPORATION, OF DETROIT, MICHIGAN, A CORPORATION OF MICHIGAN.

STEERING WHEEL.

Application filed April 21, 1924. Serial No. 708,057.

*To all whom it may concern:*

Be it known that I, CHARLES W. BECK, a citizen of the United States of America, residing at Detroit, in the county of Wayne and State of Michigan, have invented certain new and useful Improvements in Steering Wheels, of which the following is a specification, reference being had therein to the accompanying drawings.

This invention relates to steering wheels for motor vehicles and the like and consists of certain novel features of construction and combination of parts as hereinafter set forth.

In the accompanying drawing:—

Figure 1 is a top plan view of a steering wheel embodying my invention;

Figure 2 is a sectional view taken on line 2—2 of Figure 1;

Figure 3 is a sectional view through a slightly modified form of steering wheel;

Figure 4 is a sectional view through the flanged collar shown in Figure 3 before being assembled upon the hub piece;

Figure 5 is a top plan view of the flanged collar shown in Figure 3;

Figure 6 is a section on the line 6—6 of Figure 3.

Referring now to the drawing in which like characters of reference designate corresponding parts throughout the several views, the numeral 1 designates a spider that is preferably formed of wood and is provided with a central opening 2 having a plurality of radially extending arms 3. A suitable rim 4 is secured to the arms at the outer ends thereof, while a metallic hub piece 5 preferably fits within the opening 2. This hub piece is preferably a die casting and is provided at its upper end with an annular flange 6 that rests in a correspondingly shaped recess 7 in the upper face of the spider 1. For preventing the hub piece 5 from turning or moving relative to the spider there are a plurality of radially extending lugs 8 that project outwardly from the hub piece below the flange 6 and engage spaced recesses 9 disposed in the spider 1 below the recess 7. To insure a tight joint between the hub piece and spider, the opposite faces 10 of the lugs 8 preferably taper approximately one degree so that when the hub piece is inserted in the opening 2, the lugs 8 will have a slight wedging engagement with the walls of the recess 9 in the spider.

For holding the hub piece 5 in the opening 2, I preferably provide a collar 11 that surrounds the hub piece 5 and is preferably provided at its upper end with an annular flange 12 that is equal in diameter to the flange 6 and abuts the lower face 13 of the spider. Sleeved upon the hub piece within the collar 11 is an annular member 14 having a reduced portion 15 at the upper end thereof embedded in the hub piece 5 and having an up-turned flange 16 at the lower end thereof bearing against the reduced lower end portion 17 of the collar 11. For holding the sides of the member 14 firmly against the sides of the hub piece, there are a plurality of projections 14′ which extend through openings 15′ in the member 14 and are provided with heads 15 that engage the outer sides of the member 14 and are adapted to be engaged by the inner faces of the collar 11 when the latter is secured in position.

In the process of construction the hub piece 5 is cast upon the reduced end portion 15 of the annular member so that portions of the metal will flow through the openings 15′ to form the headed projections 14′, and is subsequently inserted in the opening 2 of the spider so that the lugs 8 engage the recesses 9. The collar 11 is then slipped over the annular member 14 and hub piece 5 so that the flange 12 abuts the lower face 13 of the spider whereupon the flange 16 is bent upwardly against the reduced portion 17 of the collar to hold the latter firmly in assembled position.

In Figure 5 of the drawing I have shown a slight modification in which the hub piece 5 is secured to the spider by means of a collar 18 that is slipped over the flange 18′ at the lower end of the hub piece so that the flange 19, corresponding to the flange 12, engages the lower face of the spider. With this construction, the collar 18 is preferably lanced at diametrically opposite points just below the flange 19 to provide the transversely extending slots 20, whereupon portions of the collar below the slots are pressed together as shown at 21 to reduce the diameter of the collar and thereby clamp the same firmly upon the hub.

From the foregoing description it will be readily apparent that I have provided a strong and durable wheel of the built-up type that is composed of very few parts and that is comparatively light in weight. These parts may be easily and quickly assembled, therefore, the cost of manufacturing the wheels is reduced to a minimum. It will also be apparent that the lugs 8 cooperate with the recesses 9 to prevent the hub piece from rotating relative to the spider. Furthermore, the tapered sides of the lugs engaging the walls of the recesses cooperate with the flange 7 to prevent longitudinal movement of the hub piece in one direction, while the flange 16 of the annular member 14 cooperates with the flanged collar 11 bearing against the lower face of the spider for preventing longitudinal movement of the hub piece in the opposite direction, hence the flanged collar cooperates with the flange 7 and the lugs for rigidly securing the hub piece to the spider.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:—

1. In a steering wheel, a spider having an opening and a plurality of spaced recesses, a hub piece in the opening having lugs provided with tapered sides engaging the walls of said recesses, a flange on the hub piece engaging one face of the spider, and a collar secured to the hub piece having a flange engaging the opposite face of said spider, said flanges cooperating with said lugs to secure said hub piece rigidly to said spider.

2. In a steering wheel, the combination with a hub, and a spider having an opening receiving the hub, of means for permanently securing the hub to the spider including a flange on the hub engaging the upper face of the spider, a sleeve secured directly to the hub having an upstanding flange, and a collar extending between the upstanding flange and the lower face of the spider.

3. In a steering wheel, the combination with a hub, and a spider having an opening receiving the hub, of means for permanently securing the hub to the spider including a flange on the hub engaging the upper face of the spider, a collar engaging the lower face of the spider, and a sleeve having a portion embedded in the hub, and a flange secured to the collar.

4. In a steering wheel, the combination with a hub, and a spider having an opening receiving the hub, of means for permanently securing the hub to the spider including a flange on the hub engaging the upper face of the spider, a collar engaging the lower face of the spider, and a member embedded in the hub having means for holding the collar against the spider.

5. In a steering wheel, the combination with a hub, and a spider having an opening receiving the hub, of a flange projecting from the hub engaging the upper face of the spider, and a collar permanently secured to the hub having a flange bearing against the lower face of the spider.

6. In a steering wheel, the combination with a spider having a central opening, and a separate hub piece in the opening, of means for securing the hub to the spider including a flange on the hub engaging the spider, a collar surrounding the hub engaging the spider, and a sleeve secured to the hub having a flange permanently secured to the collar.

7. In a steering wheel, the combination with a spider having a central opening, and a separate hub piece in the opening, of means for securing the hub to the spider including a flange on the hub engaging the upper face of the spider, a tubular collar surrounding the hub having a flange engaging the lower face of the spider, and a sleeve anchored in the hub having a flange crimped around the collar.

8. In a steering wheel, the combination with a hub having a lateral flange, of a collar surrounding the hub having a lateral flange spaced from the flange aforesaid, a spider surrounding the hub between the first and last mentioned flanges, and means for retaining the spider between said flanges including an element permanently secured to the hub retaining the collar in position upon the hub.

9. In a steering wheel, the combination with a hub having a flange, of a collar surrounding the hub between the first and last mentioned flanges, and means for holding the spider between said flanges including a sleeve having a portion imbedded in the hub and a portion retaining said collar on said hub.

10. In a steering wheel, the combination with a cast metal hub having a flange at its upper end, an annular member having its upper end embedded in the hub, a spider surrounding the hub, and means engaging the annular member for retaining the spider against the flange aforesaid.

11. In a steering wheel, the combination with a cast metal hub having a flange at its upper end, an annular member having its upper end embedded in the hub, a spider surrounding the hub, and means cooperating with said flange for retaining said spider on said hub including a second annular member engaging the first annular member.

In testimony whereof I affix my signature.

CHARLES W. BECK.